J. H. MARK.
SCREW POWER BRAKE FOR VEHICLES.
APPLICATION FILED MAR. 15, 1909.
980,310.
Patented Jan. 3, 1911.
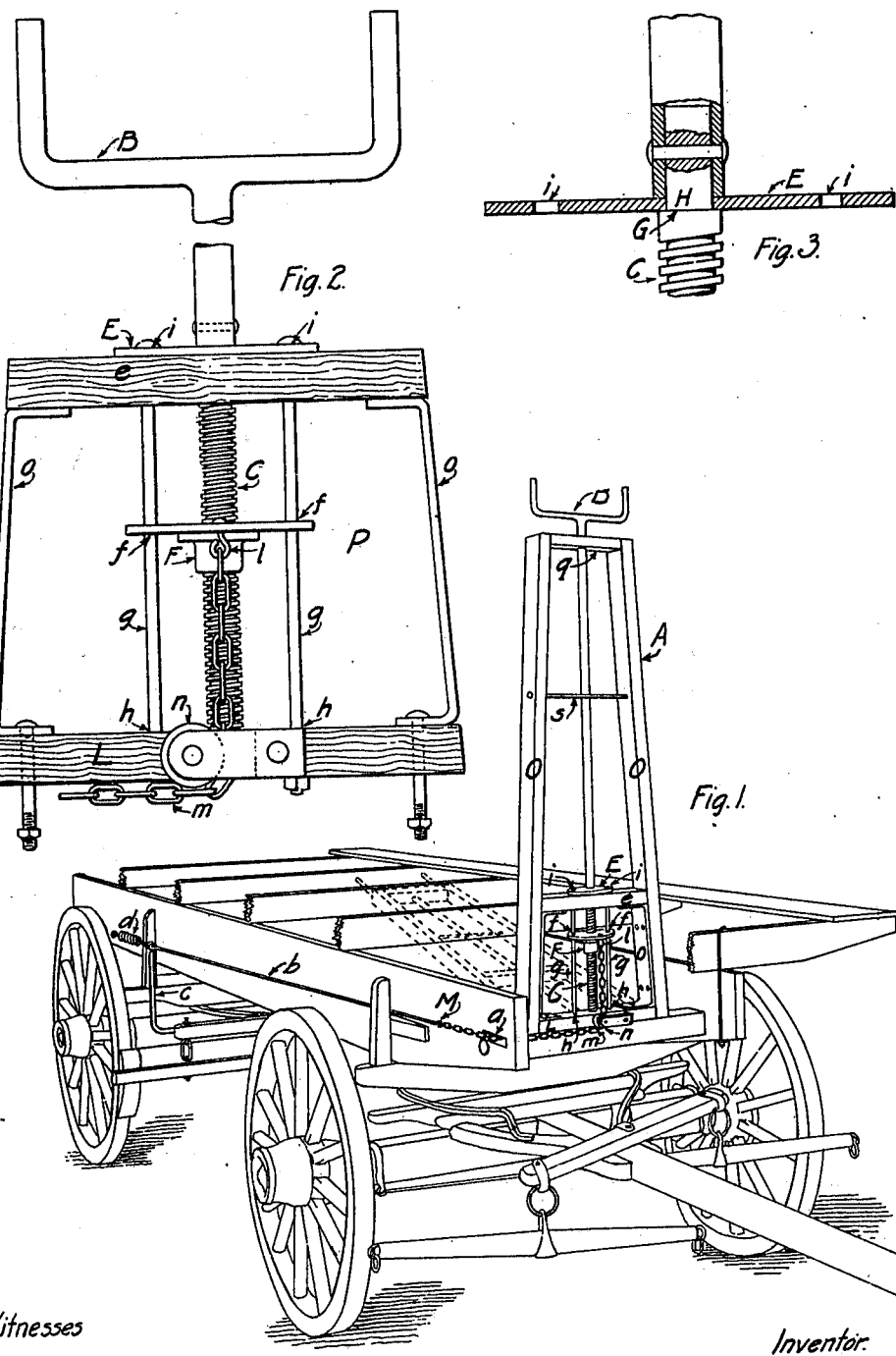
Witnesses
Chauncy R. Connerley
Howard W. Clark
Inventor:
John H. Mark ated to the brake by means of a flexible connector, held taut by a spring, said connector
UNITED STATES PATENT OFFICE.

JOHN H. MARK, OF MONTEZUMA, INDIANA.

SCREW-POWER BRAKE FOR VEHICLES.

980,310.

Specification of Letters Patent.

Patented Jan. 3, 1911.

Application filed March 15, 1909. Serial No. 483,554.

*To all whom it may concern:*

Be it known that I, JOHN H. MARK, a citizen of the United States, residing at Montezuma, R. R. No. 1, in the county of Parke and State of Indiana, have invented a new and useful Screw-Power Brake for Vehicles, of which the following is a specification.

My invention relates to an improved brake mechanism, which is primarily designed for use on a hay wagon, to enable the driver to control the brake either from the top of a load of hay or grain or from the empty rack.

The description and appended drawings relate to the specific application of the invention to a hay wagon. It may however be advantageously used on other types of vehicles, and I do not wish to restrict my claim for invention to the particular application shown and described here.

Figure 1 is a perspective view of the wagon with my invention in place. Fig. 2 is a front elevation of the essential parts of the invention disconnected from the wagon. Fig. 3 is a detailed view of the connection between the screw and crank shaft, and shows the collar bearing which sustains the end thrust of the screw.

The same letters refer to the same parts in all views.

In Fig. 1 the front ladder, to which my device is attached, is shown in its vertical position and also, in dotted lines, its appearance when folded back on the empty rack. The ladder carries a screw, C, the upper end of which is attached to a crank shaft which terminates, at the top of the ladder, in a crank, B. To sustain the end thrust of the screw a bearing plate, E, is employed between the shoulder on the upper end of the screw and the lower end of the crank shaft. See Fig. 3. On the screw is a nut, F, which is prevented from rotating with the screw by suitable guides. The drawings show how this constraint may be obtained by two rods, *g*, *g*, passing through the holes, *f*, *f*, in a plate attached to the nut; but I do not wish to limit myself to the employment of the particular method shown here. Attached to the nut is a chain, or some form of flexible connector, which passes under a guide roll, *n*, at the bottom of the frame and thence, horizontally, to the guide roll, *a*, in the sill of the wagon bed. The end of the chain is attached to the brake rod, *b*, at M.

A retractive device is employed which, as shown in the drawing, is a spring *d* attached to the brake lever end of the flexible connector, but which may also be a counter weight.

To set the brake the crank is turned in such a direction as to raise the nut and put a tension on the chain. This tension is transmitted to the brake lever, *c*, by the brake rod, *b*. To release the brake the crank is reversed.

It should be noted that the length of chain between rolls *n* and *a* (where it is parallel to and nearly coincident with the axis about which the ladder turns when folding back) is practically constant for all positions of the ladder. Hence the brake may not only be set or released with the ladder in any position, but it may be set and the ladder afterward moved without sensibly affecting the brake shoe pressure. I am aware that other wagon brakes possess some of these advantages, but believe that their combination in one device is novel.

I claim:

In a vehicle brake, the combination of a screw, mounted as described, provided with a crank to rotate it and directly attached thereto as a continuation of the crank shaft, a nut on this screw so restrained as to operate longitudinally on the screw, these parts being arranged in a frame pivotally mounted on the vehicle in such a manner as to operate from any angle, with a further combination to transmit the power thus generated to the brake by means of a flexible connector, held taut by a spring, said connector being attached to the screw nut at one end and to the brake lever at the other by passing over guide rolls which allow the power frame to be placed in any position or at any angle on the vehicle which convenience or necessity may require.

JOHN H. MARK.

Attest:
 CHANCY R. CONNERLEY,
 HOWARD W. CLARK.